United States Patent [19]

Imanari et al.

[11] Patent Number: 4,855,115

[45] Date of Patent: Aug. 8, 1989

[54] PROCESS FOR REMOVING NITROGEN OXIDES FROM EXHAUST GASES

[75] Inventors: Makoto Imanari; Takeo Koshikawa, both of Ami; Akihiro Yamauchi, Koganei; Masayuki Hanada, Kitakyushu; Morio Fukuda, Kitakyushu; Kiyoshi Nagano, Kitakyushu, all of Japan

[73] Assignees: Mitsubishi Petrochemical Co. Ltd.; Mitsubishi Jukogyo Kabushiki Kaisha; Catalysts & Chemicals Industries, Co., Ltd.; Mitsubishi Petrochemical Engineering Co., Ltd., all of Tokyo, Japan

[21] Appl. No.: 79,158

[22] Filed: Jul. 29, 1987

[30] Foreign Application Priority Data

Jul. 29, 1986 [JP] Japan .................. 61-178347
Jun. 19, 1987 [JP] Japan .................. 62-151450

[51] Int. Cl.$^4$ .......................... B01J 8/00; C01B 17/00
[52] U.S. Cl. .................................................. 423/239
[58] Field of Search ........................... 423/239, 239 D

[56] References Cited

U.S. PATENT DOCUMENTS 4,466,947  8/1984  Imanari et al. .............. 423/239

FOREIGN PATENT DOCUMENTS 56-48248  1/1981  Japan .
56-15841  2/1981  Japan .

*Primary Examiner*—Gregory A. Heller
*Attorney, Agent, or Firm*—Wenderoth, Lind & Ponack

[57] ABSTRACT

A process for removing nitrogen oxides from an exhaust gas containing the nitrogen oxides and an arsenic compound, which comprises bringing said exhaust gas into contact with a reducing gas in the presence of a catalyst to reduce the nitrogen oxides in the exhaust gas and render them nontoxic. There are disclosed two types of catalysts: (1) a catalyst comprising (A) an oxide of titanium, (B) an oxide of at least one metal selected from tungsten and molybdenum, (C) an oxide of vanadium, and (D) an oxide and/or a sulfate of at least one metal selected from the group consisting of yttrium, lanthanum, cerium and neodymium, and (2) the above (A), (B), (C) components and (D)' at least one metal selected from the group consisting of yttrium, lanthanum, cerium, neodymium, copper, cobalt, manganese and iron, the component (D)' being deposited on zeolite.

5 Claims, 1 Drawing Sheet

PROCESS FOR REMOVING NITROGEN OXIDES FROM EXHAUST GASES

This invention relates to a process for removing nitrogen oxides from exhaust gases. More specifically, it relates to a process for reducing and removing nitrogen oxides in an exhaust gas containing an arsenic compound in the presence of a catalyst which maintains its activity over a long period of time without being readily poisoned by the arsenic compound.

Methods have been known to reduce and render non-toxic nitrogen oxides (to be sometimes referred to as $NO_x$) contained in exhaust gases from various fixed generation sources, particularly exhaust gases from various combustion furnaces such as a sintering furnace, a combustion furnace and a boiler, by contacting them with reducing gases such as ammonia. Various catalysts such as catalysts of the vanadium-titanium type, vanadium-tungsten-titanium type and vanadium-alumina type are known for use in such methods. Many of them have problems still desired to be solved in regard to activity, strength and cost, and also to durability to sulfur compounds, alkaline components, and arsenic compounds in exhaust gases. Particularly, when the exhaust gases contain arsenic compounds, the catalysts are poisoned by arsenic compounds and rapidly lose activity during use.

Arsenic compounds have long been known to be activity poisoning substances against catalysts used in various reactions. A typical poisoning action of arsenic compounds is seen in hydrogenation reaction with a platinum or palladium catalyst in the liquid phase or a reaction of synthesizing anhydrous sulfuric acid from $SO_2$ using a vanadium pentoxide catalyst.

This catalyst poisoning action of arsenic compounds is similarly observed in the reaction of reducing $NO_x$ in exhaust gases to render them non-toxic. Many denitration catalysts rapidly lose activity in the presence of arsenic compounds in exhaust gases and become industrially useless.

Boiler exhaust gases from burning of coal, heavy oils, etc. as fuels and exhaust gases of a glass melting furnace frequently contain arsenic compounds. One example of a particularly high arsenic content is in a boiler exhaust gas resulting from burning of coal occurring in Europe as a fuel.

The denitration catalysts, when designed for treating dust-free exhaust gases, may be in the form of pellets or beads. For treatment of dust-containing exhaust gases, they are advantageously in the form of a honeycomb. It is important therefore that honeycomb catalysts have practical strength.

Japanese Patent Publication No. 33619/1986 discloses a denitration catalyst for use in catalytically reducing nitrogen oxides in an exhaust gas at a temperature of 250° to 650° C. in the presence of ammonia. This catalyst is prepared by depositing an active component comprising vanadium oxide and tungsten oxide in a weight (%) ratio of from 1:5 to 1:50 on a carrier containing titanium oxide as a main component, the amount of the active component being 2 to 25% by weight of the carrier, and thereafter coating 0.5 to 2.5% by weight of cerium oxide on the resulting product.

Japanese Patent Publication No. 50488/1985 describes a denitration catalyst for use in reducing nitrogen oxides in an exhaust gas in the presence of ammonia. This catalyst comprises titanium oxide, 2 to 25% by weight, based on titanium oxide, of vanadium oxide and tungsten oxide in a weight ratio of from 1:2 to 1:50, and 0.01 to 5% by weight, based on titanium oxide, of at least one compound selected from lanthanum oxide, praseodymium oxide, neodymium oxide, samarium oxide, europium oxide and yttrium oxide.

None of these patent documents state whether these denitration catalysts can maintain catalytic activity for an extended period of time without poisoning by arsenic compounds when used to treat exhaust gases containing aresenic compounds.

It is an object of this invention to provide a process for removing $NO_x$ from exhaust gases containing arsenic compounds over long periods of time with industrial advantage by using a catalyst which can maintain high $NO_x$ reducing activity without being poisoned by the arsenic compounds.

Another object of this invention is to provide a catalyst having resistance to poisoning by arsenic compounds and high strength even in the form of a honeycomb, and a process for rendering non-toxic, and removing, nitrogen oxides in an exhaust gas containing an arsenic compound in the presence of the above catalyst.

Further objects of this invention along with its advantages will become more apparent from the following description.

According to this invention, the above objects and advantages of the invention are achieved by a process for removing nitrogen oxides from an exhaust gas containing the nitrogen oxides and an arsenic compound, which comprises bringing said exhaust gas into contact with a reducing gas in the presence of a catalyst to reduce the nitrogen oxides in the exhaust gas and render them non-toxic, said catalyst comprising (A) an oxide of titanium,
(B) an oxide of at least one metal selected from tungsten and molybdenum in an amount of 0.001 to 0.3 atom as the metal for each titanium atom in component (A),
(C) an oxide of vanadium in an amount of 0.001 to 0.1 atom as vanadium for each titanium atom in component (A), and
(D) an oxide and/or a sulfate of at least one metal selected from the group consisting of yttrium, lanthanum, cerium and neodymium in an amount of 0.001 to 0.5 atom as the metal for each titanium atom in component (A).

BRIEF DESCRIPTION OF THE DRAWING

The accompanying drawing.

Figure 1:
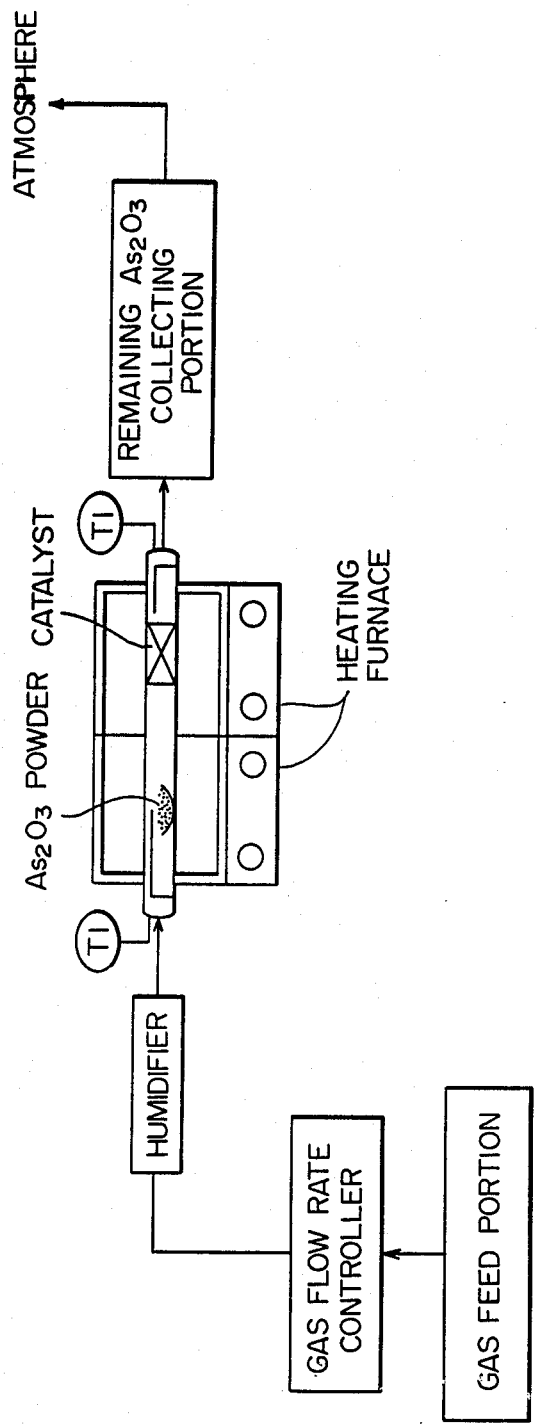
FIG. 1, is a schematic view of a forced arsenic degradation device for testing the arsenic poisoning resistance of the catalyst of this invention.

The present inventors attempted to denitrate boiler exhaust gases from burning of coals occurring in Europe by using a known titanium-tungsten-vanadium type catalyst, and found that depending upon the type of coal, the $NO_x$ reducing activity of the catalyst decreased to about 30% of its initial activity after use for about half a year. The inventors looked into the cause of this unusual reduction in activity, and found that in addition to the adhesion of components which usually reduce the activity of the catalyst, such as sulfur compounds and alkaline components, and the adhesion of components which block the pores of the catalyst and physically degrade the catalyst, the poisoning of the catalyst by an arsenic compound is a serious cause of reducing the activity of the catalyst. Based on this finding, the present inventors began to make investigations in order to develop a catalyst having resistance to poisoning by an arsenic compound, and have now arrived at the present invention.

Various catalysts were prepared, and examined for resistance to poisoning by an arsenic compound by measuring the $NO_x$ removing activities of the catalysts before and after forced degradation by arsenic in an arsenic poisoning resistance test to be described hereinafter.

Investigations of the present inventors have led to the discovery of the totally unexpected fact that while a number of catalysts showed a drastic reduction in activity after forced degradation by arsenic, the catalysts used in the process of this invention have durability to poisoning by an arsenic component in forced degradation by arsenic, and with some compositions, the catalysts rather show higher activity than the initial activities.

The mechanism of the action of an arsenic compound on the catalysts used in the process of this invention has not yet been entirely clear. To study the mechanism of its action, a vanadium-free titanium-tungsten catalyst and a titanium-tungsten-cerium catalyst were prepared, and subjected to the arsenic poisoning resistance test. It was determined that the titanium-tungsten catalyst does not show resistance to poisoning by an arsenic component, whereas the titanium-tungsten-cerium catalyst shows resistance to poisoning by an arsenic component and at times, has increased activity after the forced degradation by arsenic.

Furthermore, in view of the fact that as shown in Comparative Example 1 given hereinafter the titanium-tungsten-vanadium catalyst has no resistance to poisoning by an arsenic component, it is believed that the unique behavior of the catalyst used in the process of this invention on an arsenic component does not directly depend upon the titanium, tungsten and vanadium components, but the new effect is produced by the component (D) of the catalyst alone or the interaction of the component (D) and the arsenic component.

The catalyst used in this invention which has resistance to toxicity by an arsenic compound should contain at least one metal selected from the group consisting of yttrium, lanthanum, cerium and neodymium. These metals may be in the form of an oxide or a sulfate.

The catalyst used in this invention comprises (A) an oxide of titanium, (B) an oxide of at least one metal selected from the group consisting of tungsten and molybdenum in an amount of 0.001 to 0.3 atom, preferably 0.002 to 0.2 atom, as the metal, for each titanium atom in component (A), (C) an oxide of vanadium in an amount of 0.001 to 0.1 atom, preferably 0.001 to 0.07 atom, as the metal for each titanium atom in component (A), and (D) an oxide and/or a sulfate of at least one metal selected from the group consistng of yttrium, lanthanum, cerium and neodymium in an amount of 0.001 to 0.5 atom, preferably 0.001 to 0.3 atom, for each titanium atom in component (A).

The catalyst used in this invention may be produced by a conventional method such as a precipitation method, a kneading method or an impregnation method.

The catalytically active components (A) to (D) may be deposited on a porous carrier such as silica, alumina or zeolite, or may be mixed with silica, alumina, magnesia, acid terra alba (Japanese acid clay), active terra alba (activated clay), etc. by thorough kneading.

The final catalyst may be in any desired shape depending upon its end usage, such as an extruded article including a honeycomb shape, a tablet, or granules obtained by tumbling granulation, or in a form in which the catalyst components are held on a plate-like substrate.

As a raw material for producing the catalyst component (A), there may be used anatase-type titanium dioxide, rutile-type titanium dioxide, and various compounds capable of forming titanium dioxide by heating, such as titanic acid, titanium hydroxide, titanium sulfate, titanium chloride, titanyl sulfate ($TiOSO_4$), metatitanic acid, titanium oxalate and tetraisopropyl titanate.

According to one preferred method, various titanium compounds generally used in catalyst preparation, such as various titanium halides and titanium sulfate are precipitated with water, aqueous ammonia, caustic alkalies, alkali carbonates, etc. to convert them into hydroxide, and then thermally decomposed to titanium dioxide.

In place of the titanium dioxide component, there can be used a compound oxide such as $TiO_2$—$SiO_2$, $TiO_2$—$ZrO_2$ and $TiO_2$—$SiO_2$—$ZrO_2$ which is formed by adding silica sol, zirconium oxychloride, etc. at the time of converting the titanium component into a hydroxide or a hydrated oxide by the precipitation method, thus mixing a hydroxide or hydrated oxide of silicon or zirconium fully with the hydroxide or hydrated oxide of titanium by such means as kneading, coprecipitation or deposition, and then thermally decomposing the mixture.

Raw materials of the catalyst components (B) and (C) are suitably oxides, oxygenic acids and oxygenates of the metals of these components.

Oxides, nitrates, sulfates, carbonates and organic acid salts of the metals may, for example, be used as raw materials for the catalyst component (D).

Even when the oxide as the catalyst component (D) reacts with sulfur oxide present in an exhaust gas to form a sulfur-containing compound, the resistance of the catalyst to poisoning by an arsenic compound can be retained.

Furthermore, the catalyst exhibits resistance to poisoning by an arsenic compound even when a sulfate salt is used as a raw material for the catalyst component (D) and is not completely decomposed at the final calcination temperature for the catalyst.

Mixed rare earth element oxides used, for example, in abrasive agents may also be used as raw materials for the catalyst component (D).

The mixed rare earth element oxides usually contain oxides of praseodymium, samarium, etc. besides the elements of the component (D). They, however, do not particularly exert a deleterious effect, and rather, as rare earth elements, are expected to perform the same action as the catalyst component (D).

The process of this invention is carried out by contacting an exhaust gas containing an arsenic compound and nitrogen oxides ($NO_x$) with a reducing gas in the presence of the catalyst described above.

The present invention can be advantageously applied to an exhaust gas containing an arsenic compound in a proportion of, for example, at least about 0.001 ppm, preferably about 0.01 ppm to about 1 ppm, as arsenic trioxide.

Hydrogen, hydrocarbons, carbon monoxide and ammonia, for example, may be used as the reducing gas. Ammonia is especially preferably used.

$NO_x$ to be removed by the process of this invention include, for example, $NO$, $N_2O_3$, $NO_2$, $N_2O_4$ and $N_2O_5$.

Reduction of NO with ammonia proceeds as schematically shown below.

$$NO + NH_3 + \tfrac{1}{4}O_2 \rightarrow N_3 + 3/2 H_2O$$

The amount of ammonia is determined according to the ratio of denitration required in accordance with the above reaction. Usually, it is about 0.3 to 1.5 moles per mole of $NO_x$.

Contacting of an exhaust gas with the reducing gas is carried out preferably at 100° to 550° C., preferably 200° to 500° C.

Treatment of the exhaust gas using the catalyst can be advantageously performed by passing the exhaust gas and ammonia through a passage filled with the catalyst. The space velocity (SV) is preferably 2,000 to 50,000 $hr^{-1}$.

The pressure is preferably atmospheric pressure to about 10 kg/cm².

In the process of this invention, the components of the catalyst may be used as deposited on porous silica, alumina, zeolite, etc.

Investigations of the present inventors have shown that a catalyst prepared by depositing the metal of the component (D) on zeolite, and mixing it with the components (A), (B) and (C) has the aforesaid performance, and when it is molded into a honeycomb shape, for example, exhibits high strength, particularly high abrasion strength.

It was also found that when copper, cobalt, manganese or iron is used instead of the metal of the component (D) in depositing it on zeolite as above, the same catalyst performance can be obtained.

Accordingly, the present invention provides a catalyst for treating an exhaust gas containing nitrogen oxides and an arsenic compound by reducing the nitrogen oxides in the exhaust gas and rendering them nontoxic, said catalyst comprising (A)' an oxide of titanium,
(B)' an oxide of at least one metal selected from the group consisting of tungsten and molybdenum,
(C)' an oxide of vanadium, and
(D)' at least one metal selected from the group consisting of yttrium, lanthanum, cerium, neodymium, copper, cobalt, manganese and iron, said component (D)' being deposited on zeolite.

Preferably, in this catalyst of the invention, the catalyst components (B)' and (C)' are deposited on the oxide of titanium (A)', and they are intimately mixed with zeolite on which the component (D)' is deposited or with which the component (D)' is ion-exchanged. Preferably, the weight ratio of the oxide of titanium (A)' to the zeolite carrier is from 20:80 to 80:20.

If the amount of zeolite is less than 20% by weight, the catalyst tends to have the reduced resistance to poisoning by an arsenic compound in the exhaust gas, and undergoes much degradation. If the amount of zeolite is larger than 80% by weight, the abrasion and crush strengths of the catalyst are undesirably reduced.

Synthetic or natural zeolites such as faujasite, mordenite, gmelinite and chabazite may be used as the zeolite.

The raw materials for the components (A) to (D) given above may also be used as raw materials for the catalyst components (A)' to (D)'. Raw materials for copper, cobalt, manganese and iron as the component (D)' may be their nitrates, sulfates, chlorides and organic acid salts.

The component (D)' may be deposited on zeolite by contacting a solution of the metal salt with zeolite. As a result of contacting between the metal salt solution and zeolite, the metal ion is deposited on the zeolite by ion exchange with the cation of the zeolite. Sometimes, it is partly adsorbed on the surface of the zeolite. There is no particular restriction on the amount of its deposition. Usually, it is desirable to deposit the desired metal so that the degree of its exchange with the cation of zeolite is at least 50%. In the case of ion exchange, the pH of the aqueous metal salt solution is preferably at least 3. At a temperature of at least 60° C., the ion exchange is carried out within a short period of time with a degree of exchange of at least 50%. If the zeolite used is weak to acids, the product is preferably washed with deionized water, etc. after the ion exchange. Usually, after the ion exchange, the product is dried and calcined at 300° to 600° C. whereby the metal can be firmly deposited and supported.

The catalyst used in this invention is obtained by kneading raw materials for the above catalyst components, if required together with a molding aid, a fibrous material, etc., extruding the mixture into a desired shape, preferably a honeycomb shape, and drying and calcining the molded mixture.

For treating an exhaust gas containing a large amount of dusts such as an exhaust gas resulting from burning of coal, the catalyst is desirably in the form of a honeycomb which has a shape having resistance to blocking by the dusts and is invulnerable to crush and abrasion by the impact or contact of the dusts. The catalyst used in his invention is a zeolite titanium type catalyst having the merits of both a zeolite catalyst and a titanium oxide type catalyst which can be advantageously exhibited particularly in a honeycomb shape.

One defect of the zeolite catalyst is its poor moldability. In the past, attempts have been made to improve its moldability by incorporating a large amount of a clay component having good plasticity and molding a mixture containing a small amount of a zeolite component, or by finely pulverizing the zeolite to break part of its crystal structure. With the mixture of zeolite and titanium oxide, the poor moldability of the zeolite catalyst is made up for by the very good moldability of the titanium oxide type catalyst, and the mixture has very good moldability.

The primary particles of the titanium oxide powder are composed of agglomerated particles having a size of several hundred Å, whereas the zeolite powder is composed of crystal grains having a size of several thousand Å to several microns. This is believed to be the reason why the mixture of both has a particle size suitable for molding, or in other words, the titanium oxide powder concurrently has the function of an aid for mixing particles having different sizes.

Mixing of particles having different sizes also favorably affects the properties of the molded product. When only zeolite is molded, the product has macropores having a pore diameter of 1000 to 6000 Å. When only the titanium oxide system is molded, the molded product has pores having a pore diameter of 100 to 500 Å. The mixture of both gives a molded product having two pore distributions with macropores having a pore size of 1000 to 6000 Å and pores having a pore size of 100 to 500 Å.

It is not clear what pore structure is suitable for denitration reaction. Activity at low temperatures is susceptible to influences of pore sizes, and catalysts having much macropores are generally highly active. In fact, zeolite-type catalysts have high activity at low temperatures whereas titanium oxide-type catalysts, at relatively high temperatures.

The zeolite-titanium oxide type catalyst of this invention has relatively stable activity at low to high temperatures.

The following examples illustrate the present invention in more detail.

In Examples 1 to 21, 32 to 34 and Comparative Examples 1 to 5, the resistance of the catalyst to poisoning by an arsenic compound was evaluated by an arsenic poisoning resistance test described below.

Test for Arsenic Poisoning Resistance

By a device for forcibly degrading the catalyst by arsenic as shown in FIG. 1 of the accompanying drawings, the catalyst was contacted with a gas containing $As_2O_3$, and after the lapse of a predetermined period of time, the catalyst was taken out.

The NO reducing activity of the so degraded catalyst and that of the non-degraded catalyst were measured under the following conditions, and from the degree of decrease of activity, the poisoning resistance to arsenic trioxide was evaluated.

The reaction of reducing NO with ammonia is affected by the concentrations of oxygen and ammonia as well as the concentration of NO. Assuming that the feed gas composition is constant and the reaction velocity is primary with respect to NO, the velocity constants K and $K_o$ (wherein K represents the velocity constant after forced degradation by arsenic, and $K_o$ represents the velocity constant before forced degradation by arsenic) are calculated from the following equation, and the ratio of $K/K_o$ is used as a measure of decrease of activity.

$$K \text{ (or } K_o) \cdot T = \ln \frac{1}{1-x}$$

wherein

T is the contact time (sec.) at the reaction temperature, and

X is the NO reaction ratio (the concentration of NO at the introduction part—the concentration of NO at the exit part)/the concentration of NO at the introduction part.

The catalyst treating temperature in the above degrading device can be set at any value within the range of temperatures at which the catalyst is actually used in a $NO_x$ reducing device. The temperature at which $As_2O_3$ powder is heated is set according to the required concentration of $As_2O_3$. Usually, the desired $As_2O_3$ concentration can be obtained at temperatures within the range of 200° to 400° C.

Forced degradation of the catalyst by arsenic in the following Examples 1 to 21, 32 to 34 and Comparative Examples 1 to 5 was carried out under the following conditions.

Catalyst temperature: 350° C.
Time: 5 hours
Gas flow rate: 2 liters/min.
Gas composition: about 50 ppm of $As_2O_3$, 1000 ppm of $SO_2$, 5% of $O_2$, 10% of $H_2O$, and the balance $N_2$.

The NO reducing activity was evaluated under the following conditions.

Reactor: quartz reaction tube with an inside diameter of 20 mm
Amount of the catalyst: 20 ml
Reaction temperature: 350° C.
Gas composition: 400 ppm of NO, 500 ppm of $NH_3$, 800 ppm of $SO_2$, 4% of $O_2$, 5% of $H_2O$ and balance $N_2$.
SV: 10000 $hr^{-1}$ For analysis of NO, the concentration of NO at the introducing part and the exist part of the reactor are measured by using a $NO/NO_x$ analyzer (Model 951, made by Toshiba-Beckmann Co., Ltd.) in accordance with the chemiluminescence detecting method.

EXAMPLE 1

(1) Preparation of a titanium-tungsten powder and a titanium-tungsten-vanadium powder Ammonium paratungstate (54 g) was added to 1440 g of a slurry of metatitanic acid ($TiO_2$ content 30% by weight), and then aqueous ammonia containing 25% of $NH_3$ was added to adjust the pH of the slurry to 8.5.

The slurry was wet-kneaded for 2 hours, dried, and then calcined at 680° C. for 5 hours to form a powder (A) composed of titanium and tungsten oxide.

To 396 g of the powder (A) was added a solution composed of 600 ml of water, 6 g of monoethanolamine and 5.16 g of ammonium metavanadate. After thorough kneading, the mixture was dried, and then calcined at 600° C. for 3 hours to give a powder (B) composed of oxides of titanium, tungsten and vanadium.

(2) The powder (B) (76 g) was kneaded under heat with 4 g of Japanese acid clay, 0.4 g of polyethylene oxide (Alcox E-30, a tradename for a product of Meisei Chemical Industry Co., Ltd.), 5.4 g of ceric sulfate and a suitable amount of water, and the mixture was extruded into a product having a diameter of 3 mm.

The molded product wad dried, and then calcined at 500° C. for 3 hours. The resulting catalyst was cut to a length of 5 mm, and subjected to the arsenic poisoning resistance test.

The velocity constants before and after forced arsenic degradation described hereinabove were measured, and the following results are obtained.

$K_o = 34.91$ (sec$^{-1}$)
$K = 36.45$ (sec$^{-1}$)
$K/K_o = 1.04$

COMPARATIVE EXAMPLE 1

A titanium-tungsten-vanadium catalyst was prepared by the same method as in Example 1 except that ceric sulfate was not added. The arsenic poisoning resistance test gave the following results.

$K_o = 33.66$ (sec$^{-1}$)
$K = 22.47$ (sec$^{-1}$)
$K/K_o = 0.67$

EXAMPLE 2

A titanium-tungsten-vanadium-cerium catalyst was prepared by the same method as in Example 1 except that 4.1 g of cerous sulfate was added instead of ceric sulfate. The arsenic poisoning resistance test gave the following results.

$K_o = 32.77$ (sec$^{-1}$)
$K = 33.98$ (sec$^{-1}$)
$K/K_o = 1.04$

EXAMPLE 3

A titanium-tungsten-vanadium-cerium catalyst was prepared by the same method as in Example 1 except that 5.0 g of cerous nitrate was added instead of ceric sulfate. The arsenic poisoning resistance test gave the following results.

$K_o = 39.83$ (sec$^{-1}$)
$K = 37.51$ (sec$^{-1}$)
$K/K_o = 0.94$

EXAMPLES 4–6

In each run, a catalyst containing yttrium (Example 4), lanthanum (Example 5) or neodymium (Example 6) was prepared and subjected to the arsenic poisoning resistance test in the same way as in Example 1. The results are shown in Table 1.

Raw materials for yttrium, lanthanum and neodymium were their nitrates, and the amount of each of these elements were adjusted to 2% by weight based on the entire catalyst components.

EXAMPLES 7–9

In each run, a catalyst containing two elements selected from the elements of catalyst component (D) was prepared and subjected to the arsenic poisoning resistance test in the same way as in Example 1. The results are shown in Table 1.

Cerous sulfate was used as a raw material for cerium, and raw materials for yttrium, lanthanum and neodymium were their nitrates.

The amounts added were 1% by weight for Ce, and 3% by weight for Y, La and Nd respectively, based on the entire catalyst components.

TABLE 1

| Example | Catalyst | $K_o$ (sec$^{-1}$, at 350° C.) | $K$ (sec$^{-1}$, at 350° C.) | $K/K_o$ (—, at 350° C.) |
| --- | --- | --- | --- | --- |
| 4 | Ti—W—V—Y (Y: 2 wt. %) | 10.05 | 17.52 | 1.74 |
| 5 | Ti—W—V—La (La: 2 wt. %) | 8.18 | 13.43 | 1.64 |
| 6 | Ti—W—V—Nd (Nd: 2 wt. %) | 10.62 | 16.82 | 1.58 |
| 7 | Ti—W—V—Ce—Y (Ce: 1 wt. % Y: 3 wt. %) | 32.75 | 36.31 | 1.11 |
| 8 | Ti—W—V—Ce—La (Ce: 1 wt. % La: 3 wt. %) | 31.01 | 37.47 | 1.21 |
| 9 | Ti—W—V—Ce—Nd (Ce: 1 wt. % Nd: 3 wt. %) | 33.18 | 36.11 | 1.09 |

EXAMPLES 10–11

In each run, a catalyst was prepared by using two mixed rare earth element oxides having different purities as raw materials for catalyst component (D), and subjected to the arsenic poisoning resistance test, in the same way as in Example 1. The results are shown in Table 2.

The two mixed rare earth element oxides are designated as Ab-1 and Ab-2, and the ingredient analysis values are shown in Table A below.

The content of the catalyst component (D) was calculated on the basis of these analysis values. When the content of the catalyst component (D) is expressed only with respect to Ce, it was adjusted to 1% by weight based on the entire catalyst components in both of the two catalysts.

TABLE A

| | The numerals in the Table are in % by weight. | | | | | |
| --- | --- | --- | --- | --- | --- | --- |
| | $La_2O_3$ | $CeO_2$ | $Pr_6O_{11}$ | $Nd_2O_3$ | $Sm_2O_3$ | Others |
| Ab-1 | 26.3 | 41.4 | 3.9 | 10.8 | 0.6 | 17.0 |
| Ab-2 | 6.0 | 75.3 | 2.8 | 8.8 | 0.8 | 6.3 |

EXAMPLE 12

Ammonium molybdate was added to a slurry of metatitanic acid ($TiO_2$ content 30% by weight), and aqueous ammonia containing 25% of $NH_3$ was added to adjust the pH of the slurry to 8.5.

The slurry was wet-kneaded for 2 hours, dried, and calcined at 600° C. for 5 hours to obtain a powder composed of titanium oxide and molybdenum oxide.

The proportions of the starting materials fed were adjusted so that the $TiO_2/MoO_3$ weight ratio became 9:1. Cerous sulfate and ammonium metavanadate were added to the resulting powder composed of titanium oxide and molybdenum oxide, and Japanese acid clay, polyethylene oxide and a suitable amount of water were added in the same proportions as in Example 1. They were kneaded under heat, and then extruded into a product having a diameter of 3 mm.

The amounts of the cerium and vanadium components added were adjusted to 2% by weight as Ce and 0.7% by weight as $V_2O_5$ respectively based on the entire catalyst components.

The molded product was dried, calcined at 500° C. for 3 hours, and subjected to the arsenic poisoning resistance test. The results obtained are shown in Table 2.

EXAMPLE 13

A catalyst having a Ce content of 2% by weight and a $V_2O_5$ content of 0.7% by weight based on the entire catalyst components with a $TiO_2$:$WO_3$:$MoO_3$ ratio of 9:0.5:0.5 by weight was prepared in the same way as in Example 12 using ammonium paratungstate as a raw material for tungsten. The catalyst was subjected to the arsenic poisoning resistance test, and the results obtained are shown in Table 2.

EXAMPLES 14–15

A catalyst having a Ce content of 4% by weight or 8% by weight was prepared and subjected to the arsenic poisoning resistance test in the same way as in Example 1.

The results obtained are shown in Table 2.

TABLE 2

| Example | Catalyst | $K_o$ (sec$^{-1}$, at 350° C.) | $K$ (sec$^{-1}$, at 350° C.) | $K/K_o$ (—, at 350° C.) |
| --- | --- | --- | --- | --- |
| 10 | Ti—W—V—(Ab-1) (Ce: 1 wt. %) | 28.48 | 25.98 | 0.91 |
| 11 | Ti—W—V—(Ab-2) (Ce: 1 wt. %) | 30.07 | 28.65 | 0.95 |
| 12 | Ti—Mo—V—Ce (Ce: 2 wt. %) | 32.64 | 32.71 | 1.00 |
| 13 | Ti—W—Mo—V—Ce (Ce: 2 wt. %) | 32.93 | 33.58 | 1.02 |
| 14 | Ti—W—V—Ce (Ce: 4 wt. %) | 32.55 | 34.15 | 1.05 |
| 15 | Ti—W—V—Ce (Ce: 8 wt. %) | 31.98 | 33.57 | 1.05 |

EXAMPLES 16-21

In each run, a catalyst containing the catalyst component (D) as shown in Table 3 was prepared, and subjected to the arsenic poisoning resistance test, in the same way as in Example 12 or 13. The results are shown in Table 3.

TABLE 3

| Example | Catalyst | $K_o$ (sec$^{-1}$, at 350° C.) | $K$ (sec$^{-1}$, at 350° C.) | $K/K_o$ (—, at 350° C.) |
|---|---|---|---|---|
| 16 | Ti—Mo—V—Ce—Y (Ce: 2 wt. % Y: 2 wt. %) | 31.97 | 32.65 | 1.02 |
| 17 | Ti—Mo—V—Ce—La (Ce: 2 wt. % La: 2 wt. %) | 33.25 | 35.11 | 1.06 |
| 18 | Ti—Mo—V—Ce—Nd (Ce: 2 wt. % Nd: 2 wt. %) | 31.63 | 31.09 | 0.98 |
| 19 | Ti—W—Mo—V—Ce—Y (Ce: 2 wt. % Y: 2 wt. %) | 32.31 | 32.88 | 1.02 |
| 20 | Ti—W—Mo—V—Ce—La (Ce: 2 wt. % La: 2 wt. %) | 34.02 | 34.72 | 1.02 |
| 21 | Ti—W—Mo—V—Ce—Nd (Ce: 8 wt. % Nd: 2 wt. %) | 31.94 | 32.41 | 1.01 |

COMPARATIVE EXAMPLES 2-5

In each run, to examine the mechanism of the function of the catalyst component (D), a catalyst containing no vanadium component and having each of the Ce contents indicated in Table 4 was prepared by using the powder (A) composed of titanium oxide and tungsten oxide prepared in Example 1, (1), and subjected to the arsenic poisoning resistance test.

TABLE 4

| Comparative Example | Catalyst | $K_o$ (sec$^{-1}$, at 350° C.) | $K$ (sec$^{-1}$, at 350° C.) | $K/K_o$ (—, at 350° C.) |
|---|---|---|---|---|
| 2 | Ti—W (Ce: 0 wt. %) | 10.80 | 6.41 | 0.59 |
| 3 | Ti—W—Ce (Ce: 1 wt. %) | 14.37 | 13.59 | 0.95 |
| 4 | Ti—W—Ce (Ce: 2 wt. %) | 14.88 | 15.45 | 1.04 |
| 5 | Ti—W—Ce (Ce: 4 wt. %) | 13.69 | 18.64 | 1.36 |

In Examples 22 to 31 and Comparative Examples 6 and 7 below, the performances of the catalysts were evaluated by using a method of poisoning by an arsenic gas, a method of measuring denitration performance and a method of testing abrasion strength which are described below.

Method of poisoning by an arsenic gas

As$_2$O$_3$ was sublimed at 200° C., and contacted with a honeycomb catalyst at 370° C. under the following conditions.

| SV: | 4700 h$^{-1}$ |
|---|---|
| Gas composition: | |
| As$_2$O$_3$ | 40 ppm |
| O$_2$ | 4 vol. % |
| SO$_2$ | 150 ppm |
| H$_2$O | 10 vol. % |
| N$_2$ | balance |

Denitration performance measuring conditions

| SV: | 10000 h$^{-1}$ |
|---|---|
| Temperature: | 350° C. |
| Gas composition: | |
| NO$_x$ | 180 ppm |
| NH$_3$ | 216 ppm |
| SO$_2$ | 200 ppm |
| O$_2$ | 4 vol. % |
| H$_2$O | 10 vol. % |
| N$_2$ | balance |

Method and conditions for testing abrasion strength

Size of the test pieces: rectangular parallel-piped (70 mm × 70 mm × 100 mm)

Abrasing agent: sand having a size of 350 to 450 microns

Gas flow velocity at the cut section of the test piece: 19 m/sec

Abrasion test time: 10 hours

EXAMPLE 22

Preparation of V$_2$O$_5$—WO$_3$—TiO$_2$ powder:

Aqueous ammonia was added to 120 kg of a slurry of titanium oxide hydrate (30% by weight as TiO$_2$) to adjust the pH of the slurry to 6.5. Ammonium paratungstate (4.5 kg) was added, and after thorough stirring, the slurry was dehydrated, dried and calcined at 680° C. for 5 hours to obtain a powder composed of titanium oxide and tungsten oxide. The powder (43 kg) was impregnated with an aqueous solution of ammonium metavanadate to produce a vanadium-tungsten-titanium powder containing vanadium in an amount of 0.6% by weight as V$_2$O$_5$. The powder was calcined at 450° C. for 4 hours to produce a V$_2$O$_5$—WO$_3$—TiO$_2$ powder.

Preparation of metal-deposited zeolite:

Seven kilograms of H$^+$-form Y-type zeolite (to be referred to as H—Y) was put in 100 liters of a 15% by weight aqueous solution of copper nitrate, and the mixture was stirred at 40° C. for 1 hour. The zeolite was separated by filtration to obtain Cu ion-exchanged zeolite. It was dried, and then calcined at 500° C. for 5 hours to obtain a Cu-deposited Y-type zeolite powder (to be referred to as Cu—Y). The powder contained Cu in an amount of 13.2% by weight as CuO.

Three kilograms of each of the V$_2$O$_5$—WO$_3$—TiO$_2$ powder and Cu—Y powder was kneaded with 3 liters of deionized water and 400 g of carboxymethylcellulose in a kneader for 1 hour. The kneaded mixture was extruded, dried and calcined at 500° C. for 5 hours to produce a honeycomb denitration catalyst. A sample having a length of 20 cm with 9 cells at the cut section was cut out from the honeycomb catalyst and subjected to the arsenic poisoning test under the conditions mentioned above. The denitration performances before and after poisoning were measured.

The abrasion strength of the above catalyst was also measured under the conditions described above.

It was found that the denitration ratio was 86.0% before the poisoning and 83.3% after the poisoning, and the amount of arsenic adsorbed on the catalyst was 1.60% as $As_2O_3$.

The denitration ratio and abrasion strength were expressed by the following equations (1) and (2).

$$\text{Denitration ratio} = \left(1 - \frac{\text{The concentration of No}_x \text{ at the reactor outlet (ppm)}}{\text{The concentration of No}_x \text{ at the reactor inlet (ppm)}}\right) \times 100 \, (\%) \quad (1)$$

$$\text{Abrasion strength} = \left(1 - \frac{\text{Weight of the test piece after abrasion (g)}}{\text{Weight of the test piece before abrasion (g)}}\right) \times 100 \, (\%) \quad (2)$$

EXAMPLES 23–26

In the same way as in Example 22, Mn—Y, Ce—Y, Fe—Y and Cu—Mor (mordenite having a Cu ion exchanged and deposited) with metal ions deposited thereon were produced using aqueous solutions of nitrates. The amounts of the metal in the metal-deposited zeolites were as follows:

MnO in Mn—Y: 32.6% by weight
$Ce_2O_3$ in the Ce—Y: 42.2% by weight
$Fe_2O_3$ in Fe—Y: 35.6% by weight
CuO in Cu—Mor: 5.74% by weight Three kilograms of the $V_2O_5$—$WO_3$—$TiO_2$ was kneaded with 3 kg of Mn—Y, Ce—Y, Fe—Y and Cu—Mor respectively, and molded and calcined to form honeycomb catalysts, and subjected to the arsenic poisoning test, in the same way as in Example 22. The denitration performances before and after the poisoning test and abrasion strengths of these catalysts were measured.

The results are shown in Table 5.

EXAMPLES 27–28

Seven kilograms of H-form Y-type zeolite was put in 100 liters of an 8% by weight aqueous solution of copper nitrate, and the mixture was stirred at 40° C. for 5 minutes. Zeolite was separated by filtration. The zeolite cake was dried at 110° C. for 12 hours. The dried zeolite was divided into two portions. One portion (3.5 kg) was put in an 8% by weight aqueous solution of cobalt nitrate, and the other portion (3.5 kg), in an 8% by weight aqueous solution of iron nitrate. The mixtures were each stirred for 30 minutes, dehydrated, dried, and calcined at 500° C. to obtain Cu—Co—Y and Cu—Fe—Y.

The Cu—Co—Y and Cu—Fe—Y were each mixed in an amount of 3.5 kg with the $V_2O_5$—$WO_3$—$TiO_2$ powder. The mixtures were each molded, calcined, and tested in the same way as in Example 22. The results are shown in Table 5.

EXAMPLE 29

While 6.75 kg of Cu—Y produced by the same method as in Example 22, 2.25 kg of the $V_2O_5$—$WO_3$—$TiO_2$ powder prepared in Example 22, and 5 liters of deionized water were kneaded, 16% by weight aqueous ammonia was added to adjust the pH of the slurry to 8.0. To the mixed slurry were added 120 g of carboxymethylcellulose and 70 g of polyethylene oxide, and they were kneaded for 1 hour. The mixture was treated in the same way as in Example 22 to give a honeycomb catalyst. It was subjected to the arsenic poisoning test, the test for denitration performance before and after arsenic and the test for abrasion strength in the same way as in Example 22. The results are shown in Table 5.

EXAMPLE 30

While 2.25 kg of Cu-deposited mordenite obtained by ion exchange, 6.75 kg of the $V_2O_5$—$WO_3$—$TiO_2$ powder, and 5 liters of deionized water were kneaded, 16% by weight aqueous ammonia was added to adjust the pH of the slurry to 8.0. Carboxymethylcellulose (120 g) and 70 g of polyethylene oxide were added to the mixed slurry and kneaded for 1 hour.

Using the kneaded mixture, a honeycom catalyst was prepared and tested, in the same way as in Example 22. The results are shown in Table 5.

EXAMPLE 31

Example 22 was repeated except that natural zeolite was used instead of the Y-type zeolite. The results are shown in Table 5.

COMPARATIVE EXAMPLE 6

Six kilograms of the $V_2O_5$—$WO_3$—$TiO_2$ powder produced in Example 22, 3 liters of deionized water and 200 g of polyethylene oxide were mixed and kneaded in a kneader for 1 hour. The kneaded mixture was treated in the same way as in Example 22 to produce a honeycomb denitration catalyst. The catalyst was tested in the same way as in Example 22, and the results are shown in Table 5.

COMPARATIVE EXAMPLE 7

While 1.53 kg of the $V_2O_5$—$WO_3$—$TiO_2$ powder produced in Example 22, 7.47 kg of the Cu—Y powder and 4 liters of deionized water were kneaded, 16% by weight aqueous ammonia was added to adjust the pH of the slurry to 8.0. Carboxymethylcellulose (120 g) and 45 g of polyethylene oxide were added to the mixed slurry and kneaded for 1.5 hours.

The kneaded mixture was molded and calcined to form a honeycomb catalyst, and tested, in the same way as in Example 22. The results are shown in Table 5.

TABLE 5

| Run | | Catalyst (weight ratio) | Initial denitration ratio (%) | Denitration ratio after AS poisoning (%) | Amount of AS adsorbed ($As_2O_3$) | Degradation ratio (*) (—) | Abrasion strength (wt. %) |
|---|---|---|---|---|---|---|---|
| Example | 22 | Ti—W—V/Cu—Y = 50/50 | 86.0 | 83.3 | 1.60 | 0.91 | 10.8 |
| | 23 | Ti—W—V/Mn—Y = 50/50 | 75.3 | 72.5 | 1.75 | 0.92 | 9.9 |
| | 24 | Ti—W—V/Ce—Y = 50/50 | 76.7 | 74.0 | 1.80 | 0.93 | 8.8 |

TABLE 5-continued

| Run | | Catalyst (weight ratio) | Initial denitration ratio (%) | Denitration ratio after AS poisoning (%) | Amount of AS adsorbed (As₂O₃) | Degradation ratio (*) (—) | Abrasion strength (wt. %) |
|---|---|---|---|---|---|---|---|
| | 25 | Ti—W—V/Fe—Y = 50/50 | 70.6 | 63.4 | 1.68 | 0.82 | 8.6 |
| | 26 | Ti—W—V/Cu—Mor = 50/50 | 79.8 | 77.4 | 1.52 | 0.93 | 10.8 |
| | 27 | Ti—W—V/Cu—Co—Y = 50/50 | 86.6 | 85.5 | 1.61 | 0.96 | 9.9 |
| | 28 | Ti—W—V/Cu—Fe—Y = 50/50 | 78.9 | 75.2 | 1.63 | 0.90 | 9.3 |
| | 29 | Ti—W—V/Cu—Y = 25/75 | 90.4 | 92.0 | 1.91 | 1.08 | 11.9 |
| | 30 | Ti—W—V/Cu—Mor = 20/80 | 80.3 | 74.8 | 1.80 | 0.70 | 13.0 |
| | 31 | Ti—W—V/Cu—Nz = 50/50 | 79.5 | 76.7 | 1.60 | 0.85 | 9.0 |
| Comparative | 6 | Ti—W—V | 78.5 | 60.2 | 1.02 | 0.60 | 6.5 |
| Example | 7 | Ti—W—V/Cu—Y = 83/17 | 80.9 | 67.5 | 0.95 | 0.68 | 7.5 |

EXAMPLES 32–34

Catalysts containing titania-silica, titania-zirconia and titania-silica-zirconia instead of titanium oxide were prepared by the procedures described below, and tested for arsenic poisoning resistance in the same way as in Example 1. The results are shown in Table 6.

Preparation of titania-silica powder

Aqueous ammonia (740 cc NH₃ 25%) was added to 1040 cc of water, and 62.14 g of Snowtex-30 (silica sol made by Nissan Chemical Co., Ltd.; SiO₂ content 30% by weight) was added to the mixture.

Separately, 200 cc of water was added to 995.8 g of a 30% aqueous solution of titanium sulfate, and the resulting solution was added gradually to the above ammoniacal aqueous solution of silica sol with stirring, and the mixture was stirred for 2 hours. The mixture was then left to stand for 1 day. The precipitate obtained was collected by filtration, fully washed with water, dried at 120° C. for 8 hours and then calcined at 550° C. for 5 hours to obtain a titania-silica powder.

Preparation of titania-zirconia powder

A mixture of 995.8 g of a 30% aqueous solution of titanium sulfate and 200 cc of water was mixed with a solution of 16.26 g of zirconium oxychloride (ZrOCl₂.8-H₂O) in 400 cc of water.

Separately, 744 cc of aqueous ammonia (NH₃ 25%) was added to 1040 cc of water. With stirring, the mixture was then added gradually to the solution prepared above. The mixture was stirred for 2 hours and then allowed to stand for one day.

The resulting precipitate was collected by filtration, fully washed with water, dried at 120° C. for 8 hours, and calcined at 550° C. for 5 hours to obtain a titania-zirconia powder.

Preparation of titania-silica-zirconia powder

Aqueous ammonia (744 cc NH₂ 25%) was added to 1040 cc of water, and 62.14 g of Snowtex-30 was added.

Separately, a solution of 16.26 g of zirconium oxychloride in 400 cc of water was well mixed with a mixture of 995.8 g of a 30% aqueous solution of titanium sulfate and 200 cc of water. The mixed solution was then gradually added with stirring to the ammoniacal aqueous solution of silica sol. After stirring for 2 hours, the mixture was allowed to stand for one day.

The resulting precipitate was collected by filtration, washed with water, dried at 120° C. for 8 hours, and calcined at 550° C. for 5 hours to obtain a titania-silica-zirconia powder.

Preparation of catalysts

Monoethanolamine (1 g), 7.51 g of ammonium paratungstate and 0.67 g of ammonium metavanadate were dissolved in 150 ml of deionized water.

TiO₂—SiO₂ (Example 32), TiO₂—ZrO₂ (Example 33) and TiO₂—SiO₂—ZrO₂ (Example 34) obtained by the procedures described above were individually added in an amount of 60 g to the resulting solution.

Furthermore, 3.93 g of acid clay, 0.4 g of polyethylene oxide and 3.71 g of cerous sulfate were added, and kneaded under heat with the above mixture. The mixture was extruded into a product having a diameter of 3 mm.

The molded product was dried and then calcined at 500° C. for 3 hours.

Thus, three catalysts were obtained.

TABLE 6

| Example | Catalyst | $K_o$ (sec$^{-1}$, at 350° C.) | $K$ (sec$^{-1}$, at 350° C.) | $K/K_o$ |
|---|---|---|---|---|
| 32 | (Ti—Si)—W—V—Ce | 20.21 | 20.74 | 1.03 |
| 33 | (Ti—Zr)—W—V—Ce | 15.38 | 15.11 | 0.98 |
| 34 | (Ti—Si—Zr)—W—V—Ce | 16.27 | 15.60 | 0.96 |

What is claimed is:

1. A process for removing nitrogen oxides from an exhaust gas containing the nitrogen oxides and an arsenic compound, which comprises bringing said exhaust gas into contact with a reducing gas in the presence of a catalyst to reduce the nitrogen oxides in the exhaust gas and render them nontoxic, said catalyst comprising
   (A) a catalytic amount of an oxide of titanium,
   (B) an oxide of at least one metal selected from tungsten and molybdenum in an amount of 0.001 to 0.3 atom as the metal for each titanium atom in component (A),
   (C) an oxide of vanadium in an amount of 0.001 to 0.1 atom as vanadium for each titanium atom in component (A), and
   (D) an oxide or a sulfate or a mixture of an oxide and a sulfate of at least one metal selected from the group consisting of yttrium, lanthanum, cerium and neodymium in an amount of 0.001 to 0.5 atom as the metal for each titanium atom in component (A).

2. The process of claim 1 wherein the amount of component (B) is 0.002 to 0.2 atom as the metal for each titanium atom in component (A).

3. The process of claim 1 wherein the amount of the component (C) is 0.001 to 0.07 atom as the metal for each titanium atom in component (A).

4. The process of claim 1 wherein the amount of component (D) is 0.001 to 0.3 atom as the metal for each titanium atom in component (A).

5. The process of claim 1 wherein the components (A), (B), (C) and (D) are deposited on silica, alumina or zeolite.

* * * * *